United States Patent
Xing et al.

(10) Patent No.: US 7,764,050 B2
(45) Date of Patent: Jul. 27, 2010

(54) SYSTEM AND METHOD OF CHARGING A BATTERY AND POWER DELIVERY USING AN ADAPTER AND CAPACITOR VOLTAGE DIVIDER

(75) Inventors: Kun Xing, Cary, NC (US); Shea Lynn Petricek, Yokohama (JP); Greg Miller, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 596 days.

(21) Appl. No.: 11/738,549

(22) Filed: Apr. 23, 2007

(65) Prior Publication Data

US 2008/0157723 A1    Jul. 3, 2008

Related U.S. Application Data

(60) Provisional application No. 60/883,111, filed on Jan. 2, 2007.

(51) Int. Cl.
*H02J 7/06* (2006.01)
*H02J 7/00* (2006.01)

(52) U.S. Cl. .................................. 320/164; 320/137

(58) Field of Classification Search .............. 320/106, 320/107, 110, 111, 112, 113, 114, 162, 164, 320/165, 166, 137, 163; 323/282, 283
See application file for complete search history.

(56) References Cited

U.S. PATENT DOCUMENTS

| | | | | |
|---|---|---|---|---|
| 5,600,186 A | * | 2/1997 | Song et al. | 307/125 |
| 5,986,437 A | * | 11/1999 | Lee | 320/162 |
| 6,144,187 A | * | 11/2000 | Bryson | 320/137 |
| 2003/0117815 A1 | * | 6/2003 | Saada | 363/40 |
| 2004/0080892 A1 | * | 4/2004 | Popescu-Stanesti et al. | 361/93.9 |

* cited by examiner

*Primary Examiner*—Edward Tso
*Assistant Examiner*—M'Baye Diao
(74) *Attorney, Agent, or Firm*—Gary R. Stanford

(57) ABSTRACT

A battery charging and power delivery system for a portable electronic device includes a first connection that connects the system to an AC/DC power adaptor. A second connection connects the system to the power bus of the portable electronic device. A third connection connects the system to a battery. A capacitor voltage divider circuit provides power to the system power bus through the second connection and provides power through the third connection. A controller provides control signals to the capacitor voltage divider and to the AC to DC power adaptor.

20 Claims, 4 Drawing Sheets

SYSTEM AND METHOD OF CHARGING A BATTERY AND POWER DELIVERY USING AN ADAPTER AND CAPACITOR VOLTAGE DIVIDER

CROSS-REFERENCE TO RELATED APPLICATIONS

This application claims priority for U.S. Provisional Application No. 60/883,111 filed on Jan. 2, 2007, which is incorporated herein by reference.

TECHNICAL FIELD

The present invention relates to systems and methods for charging a battery and delivering power to an associated electronic device, and more particularly, to a method for charging a battery and delivering power to an associated electronic device using a power adapter and associated voltage divider circuit.

BACKGROUND

Portable electronic devices such as notebook computers rely upon an external power source, such as an AC/DC adapter connected to a wall power outlet to charge an associated battery pack and power the operation of the connected electronic device. When the AC/DC adapter is removed from the electronic device, the battery pack takes over responsibility for powering the device and sustaining system operations. There are several existing power delivery and battery charging schemes utilized with electronic devices such as a notebook computer.

One power delivery and battery charging architecture uses a separate battery charging and system power bus scheme. This is the dominant power delivery and battery charging scheme used in notebook computers today. The configuration provides two power flows from the adapter input. One path forms the power system bus which provides the power to all components within the notebook computer except for the battery. The second path comprises the battery charging path. As the battery is being charged, it is isolated from the system power bus. Once the adapter is unplugged, the battery is connected to the system power bus. With such a power delivery architecture, when an adapter is present, the voltage on the system power bus equals the adapter voltage, typically 19 volts. When the adapter is unplugged, the voltage on the system power bus equals the battery voltage, typically 16.8 to 11.2 volts for a four cell series battery pack or 12.6 volts to 8.4 volts for a three cell series battery pack. Thus, the combined voltage range using the adapter mode and the battery power mode varies from the adapter voltage down to the battery voltage. Due to the wide variation of the input voltage values, the downstream converter design must consider the voltage stresses at a high voltage mode, the adapter mode, and thus make compromises in the component selection, thermal management considerations and other electrical performances of the architecture.

A second power delivery configuration comprises the combined battery charger and system power bus architecture. This configuration was proposed to overcome the shortcomings associated with the wide input voltage range of the separate battery charging and system bus architecture. Within this configuration, the adapter input voltage is stepped down to a lower voltage level by a buck converter regulator. While charging the battery, the same output voltage of the buck regulator is connected to the system bus to provide the same voltage for the other devices within the notebook computer as is provided by the battery. Once the battery is fully charged, it is isolated from the system power bus while the adapter is connected. Once the adapter is unplugged, the battery is reconnected to the system bus to sustain continuous system operations. With the help of the buck converter, the system power bus has a narrower voltage range typically determined by the voltage range of the battery within the device. This power delivery architecture is often referred to as narrow VDC or NVDC1. With the application of the narrower voltage range on the system bus, the downstream converters can be designed with better component selection, higher operational efficiency and better system performance. However, the buck converter is serving as a pre-regulator of the adapter input voltage to the system. The overall power delivery efficiency is a multiple of the efficiency of the pre-regulator, and the efficiency of the downstream voltage range. The overall system efficiency may actually be lowered depending upon the design. Since the buck converter regulator delivers the total power to the system, the thermal stresses may be higher with a lower efficiency compared to the architecture of the separate battery charging and system power bus scheme described previously.

An adapter battery charger architecture has also been used. In this configuration, the adapter directly serves as the battery charger and the system power bus is also derived from the same adapter input. A power monitoring circuit provides feedback on the status of the battery and the power system to the adapter in order to regulate the voltage from the adapter. The adapter battery charger configuration is referred to as NVDC2. Similar to the NVDC1 configuration, NVDC2 has a narrow input voltage range and enables better design of the downstream power converters. NVDC2 facilitates the design of a connected notebook computer, but raises additional issues on the adapter design and the interface between the adapter and the connected electronic device such as a notebook computer. This configuration significantly increases the output current requirement of the adapter and thus makes the adapter less efficient. The adapter also has more power to dissipate which aggravates the thermal issues within the adapter. The configuration also increases the adapter to notebook cabling requirements and raises new issues related to the adapter and notebook connectors. Thus, it would be desirable to have an adapter/battery charging configuration that would overcome the problems associated with the previously utilized architectures.

SUMMARY

The present invention, as disclosed and described herein, includes in one embodiment thereof, a battery charging and power delivery system for a portable electronic device. The system includes a first connection for connecting the system to an AC to DC power adaptor, a second connection for connecting to a system power bus of the portable electronic device and a third connection for connecting to a battery. A capacitor voltage divider circuit provides power to the system power bus through the second connection. The capacitor voltage divider circuit also provides power to the battery through the third connection. A controller provides control signals to the capacitor voltage divider and to the AC to DC power adaptor.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
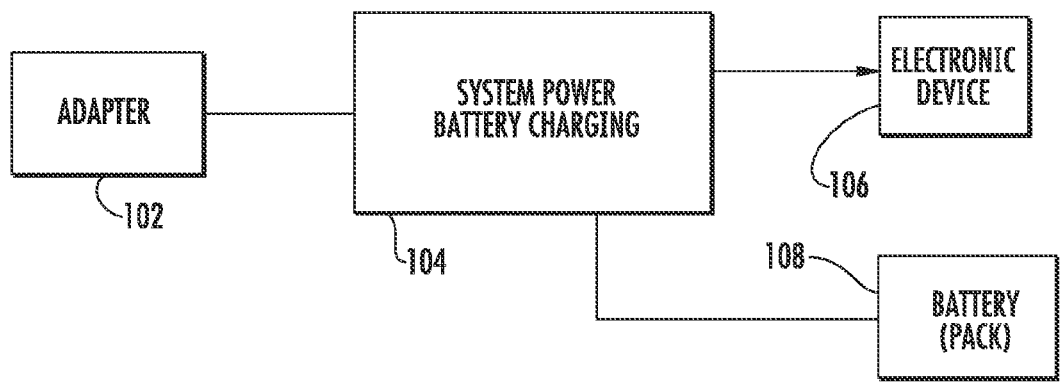
FIG. 1 is a block diagram of a power system and charging scheme for an associated adapter, battery and electronic device.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention. Although the preferred embodiment has been described in detail, it should be understood that various changes, substitutions and alterations can be made therein without departing from the spirit and scope of the invention as defined by the appended claims.

Referring now to the drawings, and more particularly to FIG. 1, there is illustrated a block diagram of a portable electronic device 108 which is powered by a connected adapter 102. The AC to DC adapter 102 is configured to plug into, for example, a wall outlet and provide a voltage to the system power and battery charging circuitry 104. The system power and charging circuitry 104 may utilize any of a number of known configurations for the improved configuration described herein to provide charging power to a connected battery pack 106 and/or to provide operating power to a connected portable electronic device 108.

Figure 2:
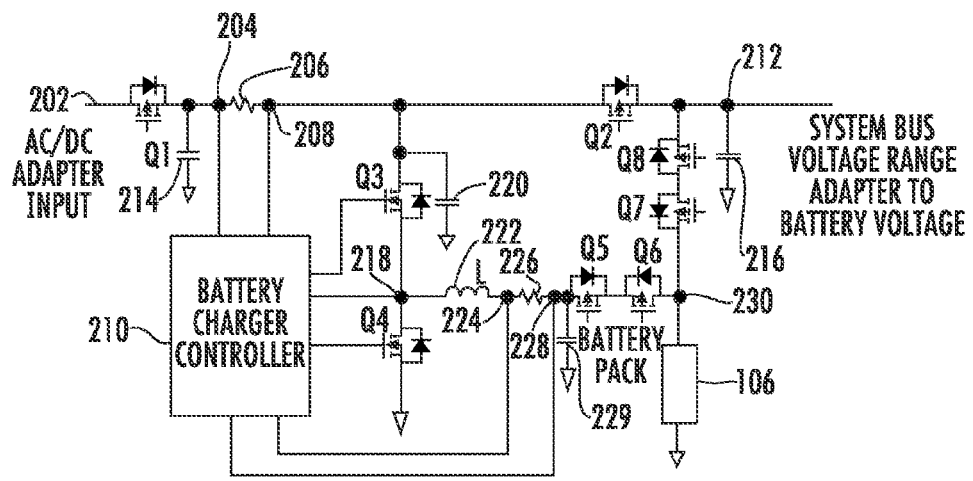
FIG. 2 is a schematic diagram of a separate battery charging and system power bus architecture.

Referring now to FIG. 2, there is illustrated a schematic diagram of a separate battery charging and system power bus architecture described previously herein. An AC to DC adapter input 202 provides for interconnection of the AC to DC adapter 102 with the circuit. A transistor Q1 is connected between the AC/DC adapter input node 202 and node 204. A resistor 206 is connected between node 204 and node 208. Nodes 204 and 208 are also connected to the battery charger 210. A second transistor Q2 is connected between node 208 and the system bus voltage output node 212. A capacitor 214 is connected between node 204 and ground. A capacitor 216 is connected between the output voltage node 212 and ground. A transistor Q3 is connected between node 208 and node 218. The gate of transistor Q3 is connected to the battery charger 210 to receive control signals therefrom. A transistor Q4 is connected between node 218 and ground. Transistor Q4 also has its gate connected to receive control signals from the battery charger 210. A capacitor 220 is connected between node 208 and ground. Inductor 222 is connected between node 218 and node 224. The battery charger 210 is also connected to node 224 to monitor the voltage at this node. A resistor 226 is connected between node 224 and node 228. The battery charger 210 is also connected to monitor the voltage at node 228. A transistor pair Q5 and Q6 are connected between node 228 and node 230. A capacitor 229 is connected between node 228 and ground. Node 230 is where the battery pack 106 connects to the device. A second pair of transistors Q7 and Q8 are connected in series between the voltage output node 212 and node 230.

The circuit of FIG. 2 provides a separate battery charging path and a separate system power bus path. The system power bus path is formed by transistor Q1 to transistor Q2 between the AC/DC input adapter node 204 and the voltage output node 212. The battery charging path is formed by transistors Q3, Q4, Q5 and Q6. As the battery is being charged, transistors Q7 and Q8 are turned off to isolate the battery from the system power bus. Once the adapter is unplugged, transistors Q5 and Q6 are turned off and transistors Q7 and Q8 are turned on to connect the battery to the system power bus. Q1, Q2, Q3 and Q4 are additionally turned off when the system bus is providing power from the battery 104 rather than the AC/DC adapter. As mentioned previously, the major problem with this type of architecture is the wide variations of the input voltage.

Figure 3:
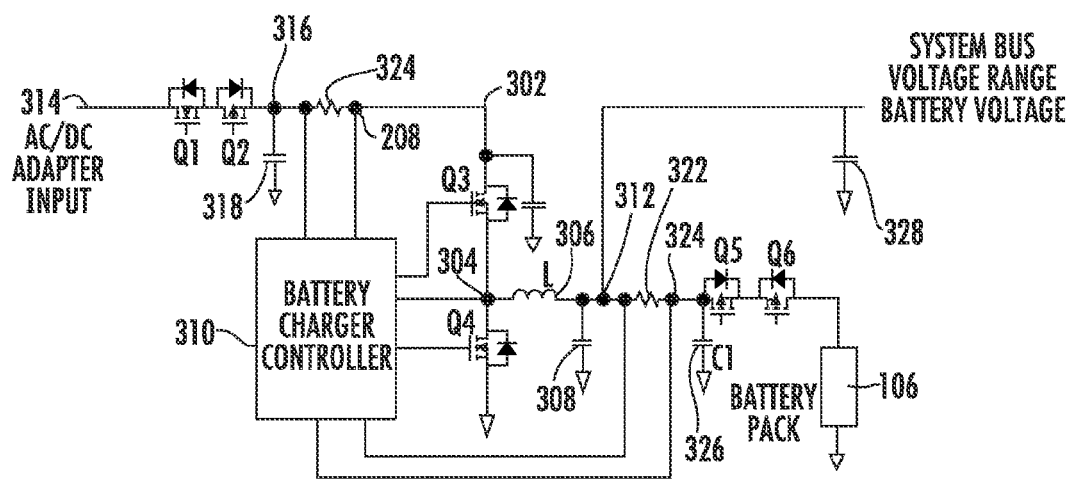
FIG. 3 is a schematic diagram of a combined battery charger and system bus using a buck converter regulator.

Referring now to FIG. 3, there is illustrated the combined battery charger and system power bus architecture. This design includes a buck converter circuit consisting of transistor Q3, transistor Q4, inductor L 306 and capacitor C1 308. Transistor Q3 is connected between node 302 and node 304. Transistor Q4 is connected between node 304 and ground. The gates of transistors Q3 and Q4 receive control inputs from a battery charger 310. Inductor L 306 is connected between node 304 and node 312 which comprises the output voltage node. The output voltage node 312 provides the system bus voltage powered by either the adapter or the battery pack 106. The AC/DC adapter is connected to the AC/DC adapter input 314. The adapter input 314 passes through a pair of transistors Q1 and Q2 to node 316. The capacitor 318 is connected between node 316 and ground. Node 316 is also connected to the battery charger 310. A resistor 320 is connected between node 316 and node 302. Node 302 is also connected to the battery charger 310. A capacitor 322 is connected between node 302 and ground. A resistor 322 is connected between the output voltage node 312 and node 324. The battery charger 310 monitors the voltage at the output voltage at node 312 and node 324. A capacitor 326 is connected between node 324 and ground. A second pair of transistors Q5 and Q6 are connected in series between node 324 and the battery pack 106. A second capacitor 328 is also connected between the output voltage node 312 and ground.

The buck converter steps down the input voltage applied by the AC to DC adapter. While the adapter is connected and the battery is charging, transistors Q1, Q2, Q5 and Q6 are turned on. Once the battery is fully charged, transistors Q5 and Q6 are turned off to isolate the battery from the system power bus. Once the adapter is unplugged, transistors Q1 and Q2 are turned off and transistors Q5 and Q6 are turned on to sustain continuous system operation and provide power to the power bus via the output voltage node 312 and battery pack 106.

Figure 4:
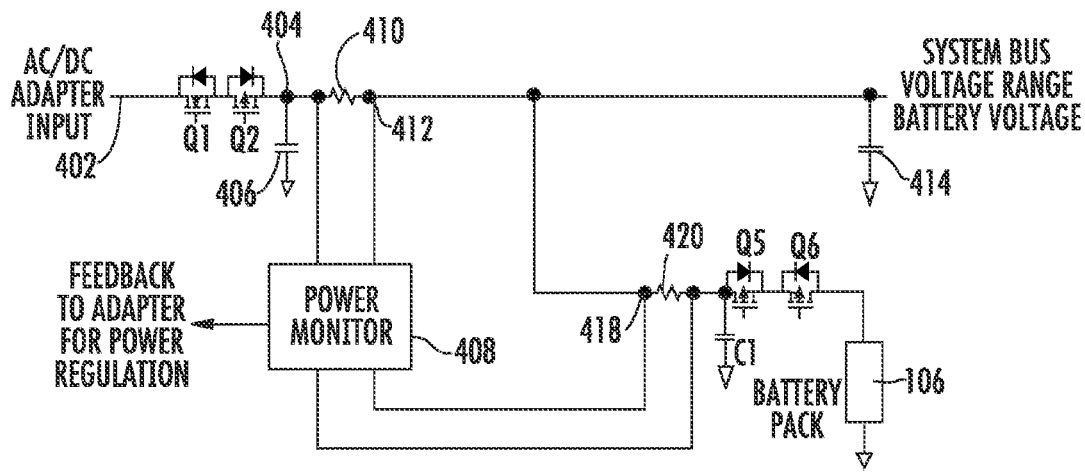
FIG. 4 is a schematic diagram of an adapter battery charger architecture.

FIG. 4 illustrates a further prior art architecture wherein the adapter is utilized as the battery charger. The AC/DC adapter is connected to an input node 402. A pair of transistors Q1 and Q2 are connected between the input node 402 and node 404. A capacitor 406 is connected between node 404 and ground. Power monitoring circuitry 406 also monitors the voltage at node 404. A resistor 410 is located between node 404 and node 412. The power monitoring circuitry 408 also monitors the voltage at node 412. Node 412 also comprises the output voltage node providing power to the system bus. A capacitor 414 resides between node 412 and ground. Node 412 is also connected to the power monitoring circuitry 408. A resistor 420 is located between node 412 and node 422. Node 422 also has its voltage monitored by the power monitoring circuitry 408. A capacitor C1 is connected between node 422 and ground. The battery pack 106 is connected to the adapter battery charger circuitry at node 422 through capacitors Q5 and Q6.

When the AC to DC adapter is connected, transistors Q1, Q2, Q5 and Q6 are turned on when the battery pack 106 is being charged enabling charging of the battery and the provision of system power at the same time. When the battery is fully charged, transistors Q5 and Q6 are turned off to isolate the battery from the system power bus. When the AC to DC adapter is disconnected, transistors Q5 and Q6 are turned on while transistors Q1 and Q2 are turned off to provide power to the system bus via the battery pack 106. The power monitoring circuitry 408 provides feedback to the AC to DC adapter enabling power regulation for battery charging when the adaptor is connected. The adapter battery charger circuitry additionally includes those limitations described previously herein which has raised the need for an improved design configuration.

Figure 5:
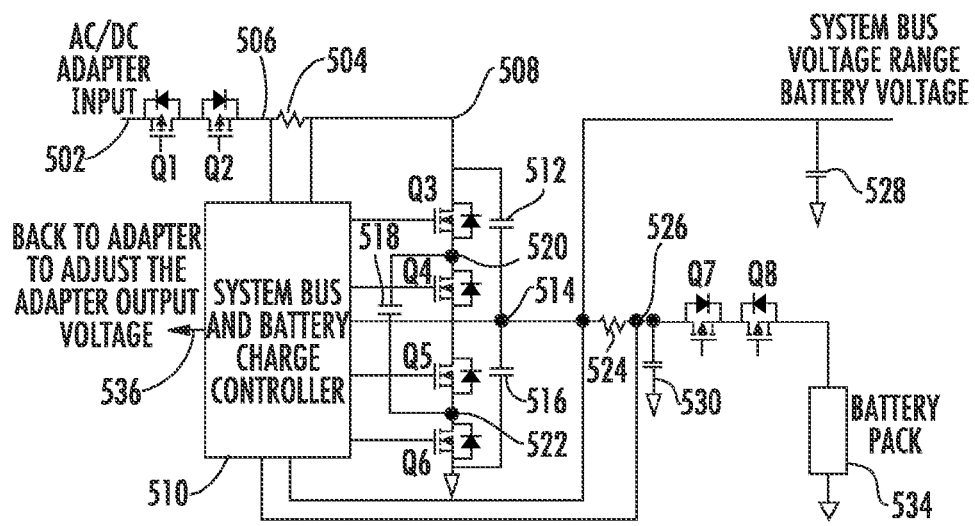
FIG. 5 is a schematic diagram of an adapter with a capacitor voltage divider for providing power delivery and battery charging according to the present disclosure.

Referring now to FIG. 5, there is illustrated an alternative embodiment for a battery charging and power delivery system circuitry having improved characteristics over those described with respect to FIGS. 2 through 4. FIG. 5 illustrates a schematic diagram of a adapter using a capacitor voltage divider circuit for power delivery and battery charging. The AC to DC adapter input is provided at node 502 to transistor Q1 and Q2 which are connected together in series. Transistor Q2 is connected to a resistor 502 at node 506. A system bus and battery charge controller 510 monitors the voltage at node 506. Resistor 504 is connected to a transistor Q3 at node 508. The system bus and battery charge controller 410 also monitors the voltage at node 508. Resistor 504 acts as an adapter current sensor. Using the value of the resistor 504 and the voltage at nodes 506 and 508 the adaptor current is determined.

A capacitor voltage divider circuit is connected between node 508 and ground. The capacitor voltage divider circuit consists of a first capacitor 512 connected between node 508 and node 514. The capacitor voltage divider circuit includes a second capacitor 516 connected between node 514 and ground. A series connection of transistors Q3, Q4, Q5 and Q6 are connected in parallel with capacitors 512 and 516 between node 508 and ground for switching the capacitor into and out of the capacitor voltage divider circuit. A capacitor 518 is connected between node 520 which lies between capacitors Q3 and Q4 and node 522 which is located between transistors Q5 and Q6. The gates of transistors Q3, Q4, Q5 and Q6 are each connected to receive control signals from the system bus and battery charge controller 510. The system bus and battery charge controller 510 also monitors the voltage at node 514.

The capacitor voltage divider is used to charge the battery 534 and power the system bus via output voltage node 526. The capacitor voltage divider circuit is controlled through the transistors Q3, Q4, Q5 and Q6 using a 50% duty cycle with variable switching frequency. The capacitor voltage divider does not itself have the ability to regulate the voltage provided to the system bus. Voltage regulation is provided by the AC to DC adapter responsive to communications provided via output wire 536 from the system bus and battery charge controller 510.

The output node 514 of the capacitor voltage divider is connected to a resistor 524 which has its opposite end connected to the voltage output node 526. The resistor 524 acts as a battery charge current sensor enabling the battery charge current to be determined based upon the resistor value and the voltage at nodes 514 and 526 determined by the controller 510. The system bus and battery charge controller 510 monitors the voltage at nodes 524 and 526. The output voltage node 526 provides system power to a connected electronic device such as a notebook computer via the system bus. A capacitor 528 is connected between node 526 and ground. A second capacitor 530 is also connected between node 526 and ground. Transistors Q7 and Q8 are connected in series with the battery pack 534. Transistors Q7 and Q8 are turned off to isolate the battery pack 534 from the system once the battery has been fully charged. When the AC to DC adapter is connected and charging the battery, each of transistors Q1, Q2, Q7 and Q8 will be turned on. When the AC to DC adapter is disconnected, transistors Q1 and Q2 are turned off and transistors Q7 and Q8 are turned on to provide power to the output voltage node and to the system bus from the battery pack 524.

Figure 6:
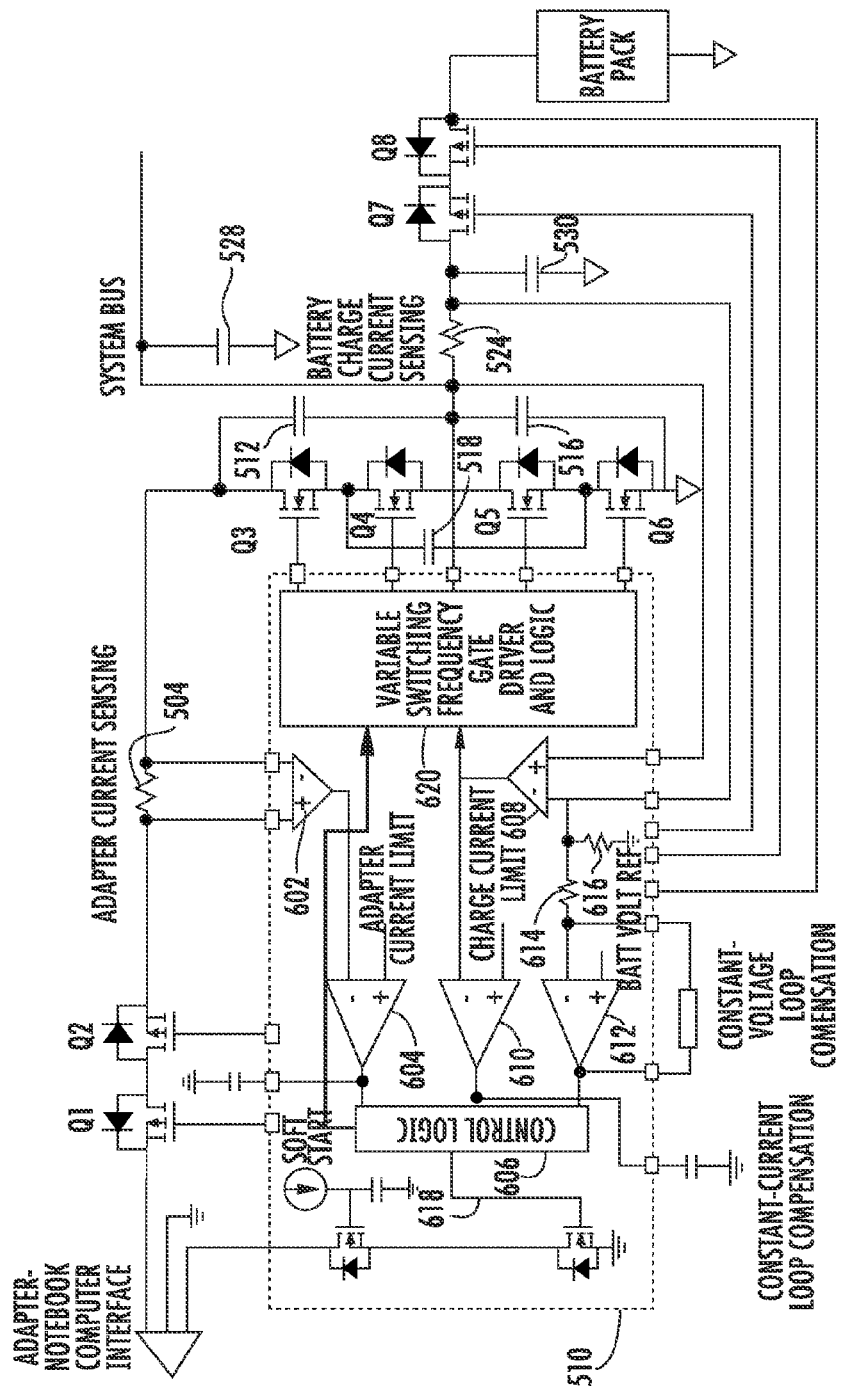
FIG. 6 is a flow diagram illustrating the operation of the system bus and battery charge controller.

Referring now to FIG. 6, there is a flow diagram more fully illustrating the manner in which the system bus and battery charge controller 510 controls the capacitor voltage divider and adaptor. The controller 510 monitors the adaptor current by applying the detected voltage at node 506 to the positive input of amplifier 610 and the voltage detected at node 508 to the negative input of current sense amplifier 602. The output of current sense amplifier 602 provides the present adaptor current level which is compared at amplifier 604 with the adaptor current limit level. When the adaptor current exceeds the adaptor current limit level, an indication of this is provided from amplifier 604 to control logic 606.

The battery charge current is similarly monitored by current sense amplifier 608. The voltage at node 514 is applied to the positive input of current sense amplifier 608. The voltage at node 526 is applied to the negative input of current sense amplifier 608. The current sense amplifier 608 provides the battery charge current level. The determined battery charge current level is applied to the negative input of amplifier 610 which is compared with the charge current limit for the battery. When the battery charging current exceeds the charge current level and notification of this is provided to the control logic 606. Amplifier 612 determines the present battery charge voltage. The battery reference voltage is applied to the positive input of amplifier 612 and the charged voltage of the battery pack is applied to the negative input of amplifier 612 through a resistor divider network consisting of resistor 614 and resistor 616. Amplifier 612 provides an indicator of when the battery is fully charged.

Control logic 606 generates control signals to the adaptor via control line 618 and back to the variable switching frequency gate driver and logic 620. The gate driver and logic 620 directly controls the switching transistors of the voltage divider network. On control bus 622 the variable switching frequency gate driver and logic utilizes a variable switching frequency to drive the transistors Q3-Q6 controlling the capacitor divider. The control logic 606 generates control inputs responsive to the measured adaptor charge current, battery charge current and battery voltage.

The input voltage range in traditional notebook computers varies from the adapter voltage (typically 19 volts) to the battery voltage (minimum of 8.4 volts for a three cell series battery pack). This wide input voltage range puts constraints on the system power design inside the notebook computer, making it less power efficient, and bringing thermal issues inside the computer. The alternative power delivery schemes described with respect to FIGS. 2 through 4 reduce the input voltage ranges to the notebook computer, but are less efficient and/or suffer from the described drawbacks. The circuit of FIG. 5 uses the capacitor voltage divider circuit and the adapter to provide battery charging and power delivering to the connected electronic device. The configuration narrows the input voltage range inside the electronic device and enables a more optimal design of the power system. The power delivery architecture of FIG. 5 provides a high input voltage from the adapter, reduces the output current requirements from the adapter, and narrows the voltage range on the system bus. Finally, the circuit provides higher overall efficiencies than those of existing power delivery systems.

It will be appreciated by those skilled in the art having the benefit of this disclosure that this invention provides a capacitor voltage divider circuit for supplying power to an electronic device and charging a battery. It should be understood that the drawings and detailed description herein are to be regarded in an illustrative rather than a restrictive manner, and are not intended to limit the invention to the particular forms and examples disclosed. On the contrary, the invention includes many further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A battery charging and power delivery system for a portable electronic device, comprising:
   a first connection for an AC/DC power adapter;
   a second connection to a system power bus of the portable electronic device;
   a third connection for a battery;
   a capacitor voltage divider circuit for providing power to the system power bus through the second connection and power to the battery through the third connection, wherein the capacitor voltage divider circuit comprises switches for toggling connection of a first capacitor in parallel with one of second and third capacitors based on switching control signals; and
   a controller for providing the switching control signals to the capacitor voltage divider and the AC/DC power adapter.

2. The battery charging and power delivery system of claim 1, wherein the capacitor voltage divider circuit is controlled with a 50% duty cycle with variable switching frequency by the control signals from the controller.

3. The battery charging and power delivery system of claim 1, wherein the control signals from the controller to the AC/DC power adapter controls regulation of a voltage applied by the AC/DC power adapter.

4. The battery charging and power delivery system of claim 1, further including switching circuitry for connecting and disconnecting the battery and the AC/DC power adapter to the system.

5. The battery charging and power delivery system of claim 4, wherein the switching circuitry further comprises:
   at least one transistor switch for disconnecting the battery from the third connection once the battery is fully charged and for connecting the battery to the third connection when the AC/DC power adapter is disconnected; and
   at least one second transistor switch for disconnecting the first connection when the AC/DC power adapter is disconnected and for connecting the first connection when the AC/DC power adapter is connected.

6. The battery charging and power delivery system of claim 1, wherein the controller provides control signals responsive to an adapter charging current, a battery charging current and a battery charge voltage.

7. The battery charging and power delivery system of claim 1, wherein the capacitor voltage divider circuit further includes:
   a plurality of capacitors; and
   a plurality of transistor switches responsive to the switching control signals for connecting the plurality of capacitors into and out of the capacitor voltage divider circuit.

8. The battery charging and power delivery system of claim 7, wherein the controller further comprises:
   a first circuitry for determining when an adapter charging current exceeds an adapter current limit and generating a first control signal responsive thereto;
   a second circuitry for determining when a battery charging current exceeds a battery charge current limit and generating a second control signal responsive thereto;
   a third circuitry for determining when a battery charge voltage exceeds a battery reference voltage and generating a third control signal responsive thereto;
   control logic for generating the switching control signals responsive to the first control signal, the second control signal and the third control signal.

9. The battery charging and power delivery system of claim 8, wherein the control logic further generates voltage control signals to the AC/DC power adapter.

10. A battery charging and power delivery system for a portable electronic device, comprising:
    a portable electronic device;
    an AC/DC power adapter for charging a battery of the portable electronic device; and
    circuitry for interconnecting the AC/DC power adapter to the battery to charge the battery and for providing system power to the portable electronic device from either the AC/DC power adapter or the battery, wherein the circuitry further includes:
      a first connection for the AC/DC power adapter;
      a second connection to a system power bus of the portable electronic device;
      a third connection for the battery;
      a capacitor voltage divider circuit for providing power to the system power bus through the second connection and power to the battery through the third connection, wherein the capacitor voltage divider circuit comprises switches for toggling connection of a first capacitor in parallel with one of second and third capacitors based on switching control signals; and
      a controller for providing the control signals to the capacitor voltage divider and the AC/DC power adapter.

11. The battery charging and power delivery system of claim 10, wherein the capacitor voltage divider circuit is controlled with a 50% duty cycle with variable switching frequency by the control signals from the controller.

12. The battery charging and power delivery system of claim 10, wherein the control signals from the controller to the AC/DC power adapter controls regulation of a voltage applied by the AC/DC power adapter.

13. The battery charging and power delivery system of claim 10, further including switching circuitry for connecting and disconnecting the battery and the AC/DC power adapter to the system.

14. The battery charging and power delivery system of claim 13, wherein the switching circuitry further comprises:
   at least one transistor switch for disconnecting the battery from the third connection once the battery is fully charged and for connecting the battery to the third connection when the AC/DC power adapter is disconnected; and
   at least one second transistor switch for disconnecting the first connection when the AC/DC power adapter is disconnected and for connecting the first connection when the AC/DC power adapter is connected.

15. The battery charging and power delivery system of claim 10, wherein the controller provides control signals responsive to an adapter charging current, a battery charging current and a battery charge voltage.

16. The battery charging and power delivery system of claim 10, wherein the capacitor voltage divider circuit further includes:
   a plurality of capacitors; and
   a plurality of transistor switches responsive to the switching control signals for connecting the plurality of capacitors into and out of the capacitor voltage divider circuit.

17. The battery charging and power delivery system of claim 16, wherein the controller further comprises:
   a first circuitry for determining when an adapter charging current exceeds an adapter current limit and generating a first control signal responsive thereto;
   a second circuitry for determining when a battery charging current exceeds a battery charge current limit and generating a second control signal responsive thereto;
   a third circuitry for determining when a battery charge voltage exceeds a battery reference voltage and generating a third control signal responsive thereto;
   control logic for generating the switching control signals responsive to the first control signal, the second control signal and the third control signal.

18. The battery charging and power delivery system of claim 17, wherein the control logic further generates voltage control signals to the AC/DC power adapter.

19. A method for charging a battery and delivering power to an associated portable electronic device, comprising the steps of:
   monitoring at least one of an adapter charging current, a battery charging current and a battery charging voltage;
   generating switching control signals responsive to the monitored adapter charging current, the monitored battery charging current and the battery charging voltage;
   toggling connection of a first capacitor in parallel with one of second and third capacitors of a capacitor voltage divider circuit located between an A/C power adapter and a battery responsive to the switching control signals.

20. The method of claim 19 further comprising the steps of:
   generating voltage control signals responsive to the monitored adapter charging current, the monitored battery charging current and the battery charging voltage; and
   controlling the voltage applied by the A/C power adapter responsive to the voltage control signals.

* * * * *